United States Patent
Meyer-Ahrens et al.

(10) Patent No.: US 8,323,788 B2
(45) Date of Patent: Dec. 4, 2012

(54) HIGHLY FLEXIBLE SHEET COMPOSITE MATERIAL

(75) Inventors: Sven Meyer-Ahrens, Leverkusen (DE); Andrea Maier-Richter, Erkrath (DE); Manfred Naujoks, Odenthal (DE); Thomas Michaelis, Leverkusen (DE); Semka Muratovic, Detmold (DE)

(73) Assignee: Bayer MaterialScience AG, Leverkusen (DE)

( * ) Notice: Subject to any disclaimer, the term of this patent is extended or adjusted under 35 U.S.C. 154(b) by 194 days.

(21) Appl. No.: 12/370,803

(22) Filed: Feb. 13, 2009

(65) Prior Publication Data

US 2009/0208727 A1 Aug. 20, 2009

(30) Foreign Application Priority Data

Feb. 15, 2008 (DE) .................... 10 2008 009 192

(51) Int. Cl.
*B32B 3/26* (2006.01)
*B44C 1/165* (2006.01)

(52) U.S. Cl. ........... 428/316.6; 428/317.1; 428/198; 428/131; 156/230

(58) Field of Classification Search ........... 428/316.6, 428/317.1, 198, 131; 156/230
See application file for complete search history.

(56) References Cited

U.S. PATENT DOCUMENTS

| | | | |
|---|---|---|---|
| 3,989,870 A | 11/1976 | Bocks et al. | |
| 4,029,534 A * | 6/1977 | Bocks et al. | 156/246 |
| 4,254,177 A | 3/1981 | Fulmer | |
| 5,294,386 A | 3/1994 | Roth et al. | |
| 5,859,081 A | 1/1999 | Duffy | |
| 6,100,309 A | 8/2000 | Illger et al. | |
| 6,271,276 B1 * | 8/2001 | Gribble et al. | 521/133 |
| 6,632,974 B1 * | 10/2003 | Suzuki et al. | 604/369 |
| 6,642,303 B2 | 11/2003 | Schütze et al. | |
| 2001/0018466 A1 | 8/2001 | Gansen et al. | |
| 2004/0253894 A1 * | 12/2004 | Fell et al. | 442/381 |
| 2006/0084710 A1 | 4/2006 | Meyer-Ahrens et al. | |
| 2006/0128885 A1 | 6/2006 | Rische et al. | |
| 2008/0014387 A1 * | 1/2008 | Murphy et al. | 428/34.1 |
| 2008/0200891 A1 * | 8/2008 | Kim et al. | 604/369 |
| 2010/0143652 A1 * | 6/2010 | Stockton et al. | 428/141 |

FOREIGN PATENT DOCUMENTS

| | | |
|---|---|---|
| DE | 2231411 A1 | 1/1974 |
| DE | 19957397 C1 | 7/2001 |
| DE | 10122444 A1 | 11/2002 |
| DE | 102004051048 A1 | 4/2006 |
| EP | 0810256 A1 | 12/1997 |
| EP | 1167019 A2 | 1/2002 |
| EP | 1669382 A2 | 6/2006 |
| WO | WO-99/28107 A1 | 6/1999 |
| WO | WO-02/090413 A1 | 11/2002 |
| WO | WO02090413 A1 | 11/2002 |
| WO | WO-2007/003348 A1 | 1/2007 |

* cited by examiner

*Primary Examiner* — Hai Vo

(74) *Attorney, Agent, or Firm* — Connolly Bove Lodge & Hutz LLP

(57) ABSTRACT

The invention relates to a highly flexible sheet composite material comprising a block flexible foam and a layer of whipped foam made of polyurethane-based dispersions two-dimensionally bonded thereto, a process for preparing such a composite material, and the use thereof.

13 Claims, No Drawings

HIGHLY FLEXIBLE SHEET COMPOSITE MATERIAL

RELATED APPLICATIONS

This application claims benefit to German Application No. 10 2008 009 192.8 filed 15 Feb. 2008, which is incorporated by reference in its entirety for all useful purposes.

BACKGROUND OF THE INVENTION

1. Field of Invention

The invention relates to a highly flexible sheet composite material comprising a block flexible foam and a layer of whipped foam made of polyurethane-based dispersions two-dimensionally bonded thereto, a process for preparing such a composite material, and the use thereof.

2. Description of the Prior Art

Composite materials having a coating based on a whipped foam are widely known in the prior art. For the preparation of such composite materials, aqueous polyurethane or acrylate dispersions that first obtain a paste-like consistency by intensive stirring or whipping are employed. The process is very similar to the preparation of whipped cream. For this reason, the term "mechanical whipped foam" is also familiar. Usually, the foams are prepared with an air content of from 20 to 80 percent by volume. The density of the foams is stated as the foam weight per liter.

Although the aqueous dispersions alone easily form foams, additives are required for stabilizing the foams, such as ammonium stearate or SLES. According to need, the foams may also contain other aggregates usual in the coating field, such as color pigments, additives, active ingredients and fillers. The dispersions employed should have correspondingly high solids contents in order that a sufficient foam weight per liter can be achieved. In polyurethane dispersions, solids contents of from 40 to 60% are usual.

For producing the foams, continuously working industrial foaming aggregates as found in the food industry are employed. The application of the whipped foam is usually performed by a doctor knife, and the set coating gap essentially determines the wet film thickness.

The foams must be dried at higher temperatures to obtain ready-to-use coatings. To remove the water contained in the foam, the wet foam is dried in several steps at increasing temperatures in a forced air flow in such a way that the water will not boil and the foam structure is not destroyed. The end temperature in the drying process is around 160° C. The dried foams have closed-pore or open-pore structures depending on the foam weight per liter employed. The dry film thickness is usually slightly lower than the wet film thickness.

The layer thickness of the coatings is from 0.05 to 1.0 mm, but several millimeters is also possible. The foams are very much finer than the usual known foams as known from sponges and foam cushions.

The purpose of foam coating is to provide volume while the consumption of material and weight remain low. In addition, the coatings are very soft and have pleasant haptics due to the foam structure. Therefore, whipped foams are employed in clothing, in medical and technological articles, but also for the preparation of leather-like materials. In some cases, the foam must be provided with further solid layers for damage protection and for design reasons. Another advantage of the use of whipped foams is that they can be processed in an emission-free or at least very low-emission process.

Now, the coating of a material with such whipped foams to form a composite material can essentially be performed by two methods:

a) In direct coating, the whipped foam is directly bonded with the support material by suitable application methods. This is followed by drying at elevated temperatures in a range of from 140 to 170° C. over several minutes in order to solidify the whipped foam coating accordingly and to provide serviceability.

In order to prevent the undesirable penetration of the applied whipped foam material into the substrate during the application and to be able to apply appropriate amounts, the viscosity and foam weight per liter is adjusted to obtain a paste-like consistency. In addition to the substrate, the type of doctor knife, which determines the coating height, and the dwelling time until the composite enters the drying line have an influence on the penetration depth.

b) In reverse coating (also referred to as transfer coating or release (paper) coating), the whipped foam coating is first applied to a release paper, cured, and only in a second step is it bonded with the material to be coated. Subsequently, after drying and firmly bonding the coating to the coated material, the release paper can be peeled off and optionally reused several times. The advantage of this method resides, on the one hand, in the possibility of providing the coating with a defined surface structure, such as a grain structure, by pre-imprinting the release paper. On the other hand, however, the bonding to the support material can be controlled more easily as compared to direct coating. Therefore, the thus prepared articles are often substantially softer.

However, such composite materials comprising a polyurethane-based whipped foam layer as known from the prior art have the disadvantage of having an insufficient flexibility for many applications. In particular, in many such composite materials, if used, for example, for cladding movable (machine) parts, it is a disturbing effect that creases are formed in the course of time, which promotes a faster wear of such composite materials.

BRIEF SUMMARY OF THE INVENTION

Therefore, it is an object of the present invention to provide a composite material having a layer of a polyurethane-based whipped foam that overcomes the above described drawbacks of the prior art. In particular, it is an object of the present invention to provide a composite material free of creases and which will not form creases over long periods of time that retains the advantageous properties of a whipped foam layer based on polyurethane dispersions, i.e., especially pleasant haptics and high flexibility.

The object of the invention is achieved by a sheet composite material comprising at least two foam elements bonded with one another, wherein one foam element comprises a base material of a block flexible foam and the second foam element comprises a layer of polyurethane-based whipped foam two-dimensionally bonded thereto.

Another object of the invention is achieved by a process for preparing the composite material which comprises bonding said block flexible foam with said layer of whipped foam.

A DETAILED DESCRIPTION OF THE INVENTION

As used herein, the singular terms "a" and "the" are synonymous and used interchangeably with "one or more."

Accordingly, for example, reference to "a foam" herein or in the appended claims can refer to a single gas or more than one foams. Additionally, all numerical values, unless otherwise specifically noted, are understood to be modified by the word "about."

A "block flexible foam" within the meaning of the present invention means those polyurethane-based flexible foams that usually (but not necessarily) result from the use of polyether polyols with mainly secondary OH groups as a polyol component. Even more preferably, the block flexible foams employed are those obtainable by the process as described in EP 0 810 256 A1, such as Hypernova® flexible foam developed by Bayer MaterialScience AG. In this respect, this application is included herein by reference. The block flexible foam is preferably elastic.

The whipped foam employed for applying the layer of whipped foam is prepared as generally described above. More preferably, the whipped foam is prepared from polyurethane dispersions. As a rule, one or more foam stabilizers, thickeners, cross-linking agents and/or pigments are added to the (mostly commercially available) polyurethane dispersion before the actual foaming. During the foaming process, in which the desired foam weight per liter is adjusted, additional thickener may also be added if required.

As polyurethane dispersions within the meaning of the present invention, it is particularly preferred to use the following, optionally in combination:

a) Anionic aliphatic polyester polyurethane dispersions

Among these, the following products sold by the Bayer MaterialScience AG have been found particularly useful: Impranil® LP RSC 1380, 1537, 1554.

b) Ionic/non-ionic polycarbonate ester polyurethane dispersions

Of these, the following product sold by the Bayer MaterialScience AG has been found particularly preferable: Impranil® LP RSC 1997.

c) Aliphatic polycarbonate ester polyether polyurethane dispersions

In particular, the following polyurethane dispersion sold by the Bayer MaterialScience AG has been found particularly preferable: Impranil® DLU Dispersion.

In this connection, EP 1 669 382 A2 is incorporated by reference in its entirety. The dispersions described therein can also be advantageously employed for preparing whipped foams.

Impranil® DLU is a polyurethane based on polycarbonate polytetramethylene glycol (PC-PTMG) characterized by a high stability. The product is compatible with the additives usually employed in textile coating and was developed for preparing high-quality coatings, for example, for cushioning material. It can be foamed mechanically or processed as a compact coating.

The other four products are further developments of existing commercial products having an increased solids content of 60%.

Impranil® LP RSC 1380 can be employed for the preparation of fashionable coatings and for the finishing of nonwovens. Apart from the higher solids content, the product properties are similar to those of Impranil® DLN. Impranil® LP RSC 1537, whose properties are similar to those of Impranil® DLP-R, was developed mainly as a soft blending component for preparing cushion materials, car seats, sporting articles and other technical products. Impranil® LP RSC 1537 is excellently suitable as an adhesive coating and is an alternative to solvent-containing products. Impranil® LP RSC 1554, whose product profile is essentially identical with that of Impranil® DLS, is suitable, in particular, for mechanical foaming and for preparing fashionable articles and clothing. All the mentioned dispersions are unreactive, but can be cross-linked with either suitable melamine resins or water-dispersible polyisocyanates for improving fastness properties.

These are high solids 60% polyurethane dispersions. All products are free from organic cosolvents, thickening agents and external emulsifiers. The "high solids" dispersions offer a number of advantages to the final user as compared to the usually employed polyurethane dispersions having solids contents of from 35 to 50%, for example, the reaching of a high solids covering in one coating operation and thereby a significant reduction of cost by increasing the machine load factor and reducing the energy costs.

As foam stabilizers, thickeners, cross-linking agents and pigments, the products sufficiently known in the prior art may be used.

The following are preferably employed:
Thickeners:
Borchigel® ALA
Mirox® AM
BYK® 420
Foam stabilizers:
Stokal® STA
Stokal® SR
Dicrylan® FLN
soap
Cross-linking agents:
Bayhydrur® 3100
Desmodur® DN
Acrafix® ML
Pigments: all water-soluble Euderm® pigments The base material of the block flexible foam and the layer of whipped foam can be bonded in various ways. In addition to (only) spotwise bonding of the two foam materials, for example, by seams, rivets or staples, a spotwise or two-dimensional adhesive layer may be used, in particular.

Surprisingly, it has been found that such composite materials retain the particularly favorable properties of its constituting components. In particular, such composite materials are highly flexible structures that do not tend to form creases even after prolonged service.

Further, for some applications, it is advantageous for the composite material according to the invention to be permeable to water vapor. This can be achieved, on the one hand, by omitting the final cover layer that is (normally) applied to a whipped foam layer, because the whipped foam layer has some water vapor permeability by itself. To further increase the water vapor permeability, it is preferred to provide the whipped foam layer with a perforation, especially a microperforation (see, for example, www.wista.com). A "microperforation" is intended to mean a perforation having holes with diameters within a range of from 0.1 to 2 mm and a perforation density of 10 pin/cm$^2$.

A microperforation is preferred because it is characterized by an extremely high water vapor permeability, but is virtually impermeable to liquid water, especially water drops, thus helping to prevent the entry of moisture in the block foam layer.

In addition, the layer thickness of the whipped foam is preferably within a range of from 0.2 to 1.0 mm, especially from 0.5 to 0.8 mm.

The above described upper limits of the layer thickness of the block flexible foam or the whipped foam are particularly favorable since the consumption of material can be limited to a minimum thereby; namely, above these limits, the mechanical properties of the composite material is not improved in any substantial way. The mentioned lower limits are particularly preferred since the mechanical properties of the composite material will deteriorate accordingly if the limits are fallen below, which holds, in particular, for the wear resistance of the two layers.

The bonding of the block flexible foam and the whipped foam is preferably effected by a continuous or non-continuous adhesive layer, especially by an adhesive layer based on an aqueous polyurethane dispersion, such as Impranil LP RSC 4002 or Impranil DLP-R.

An adhesive layer provides for a permanent and reliable bonding between the two foam materials. An adhesive layer based on an aqueous polyurethane dispersion has the particular advantage that the adhesive layer formed after the bonding also has a high flexibility and thus does not adversely affect the mechanical properties of the composite material.

In a second embodiment, the object of the invention is achieved by a process for preparing a composite material characterized in that a block flexible foam is bonded with a layer of whipped foam.

In particular, the process is performed to comprise the following steps:
a) providing a release paper and applying a whipped foam, especially a whipped foam having a density within a range of from 200 to 800 g/l, on the whole or part of the surface thereof;
b) curing the whipped foam layer applied by step a), especially at an elevated temperature in a range of from 70 to 170° C., to form the layer of whipped foam;
c) applying an adhesive layer, especially an adhesive layer based on an aqueous polyurethane dispersion, to said layer of whipped foam (on the side opposite of the release paper) and/or to a sheet of block flexible foam;
d) applying the block flexible foam to the whipped foam (with the adhesive layer between);
e) curing the adhesive layer;
f) removing the release paper.

The polyurethane dispersions used in step a) to prepare the whipped foam preferably have a solids content of $\geq 50\%$ by mass, because these have the advantage to be miscible with water at any ratio, to dry more quickly and further to allow the adjusting of even very high foam weights per liter.

The process described just above results in a reliable and permanent bonding of the two foam materials and in addition has the advantage that a structure can be introduced on the side facing away from the block flexible foam by using a release paper.

More preferably, the above process is performed by performing steps a) to f) in one operation. By omitting several separated process steps, the process cost is reduced accordingly.

In a third embodiment, the object of the invention is achieved by the use of a composite material as described above for the cladding and/or sheathing of moveable or immovable objects and/or apparatus. It may also be used, for example, as a furniture, furniture cover or in the automobile field, for example, as a seat cover.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

The invention claimed is:

1. A sheet composite material comprising at least two foam elements bonded with one another, wherein one foam element comprises a base material of a block flexible foam and the second foam element comprises a layer of whipped foam made of polyurethane-based dispersions, wherein said whipped foam layer is perforated on the whole or part of its surface, wherein the perforations are holes having diameters within the range of from 0.1 to 2 mm and a perforation density of 10 pin/cm$^2$, wherein said block flexible foam is a polyurethane foam, and wherein the perforations penetrate the entire thickness of the whipped foam layer.

2. The composite material according to claim 1, wherein said whipped foam layer is microperforated on the whole or part of its surface.

3. The composite material according to claim 2, wherein the layer thickness of the whipped foam is within a range of from 0.5 to 0.8 mm.

4. The composite material according to claim 3, wherein the block flexible foam and the whipped foam are bonded together by an adhesive layer based on an aqueous polyurethane dispersion.

5. The composite material according to claim 1, wherein the layer thickness of the whipped foam is within a range of from 0.2 to 1.0 mm.

6. The composite material according to claim 1, wherein the block flexible foam and the whipped foam are bonded together by a continuous or non-continuous adhesive layer.

7. The composite material according to claim 1, wherein the block flexible foam is elastic.

8. A cladding comprising the composite material according to claim 1.

9. A sheeting comprising the composite material according to claim 1.

10. A process for preparing the composite material according to claim 1 which comprises bonding said block flexible foam with said layer of whipped foam.

11. The process according to claim 10, wherein the following steps are performed:
a) providing a release paper and applying a whipped foam on the whole or part of the surface thereof;
b) curing the whipped foam layer applied by step a), to form the layer of whipped foam;
c) applying an adhesive layer based on an aqueous polyurethane dispersion, to said layer of whipped foam on the side opposite of the release paper and/or to a sheet of block flexible foam;
d) applying the block flexible foam to the whipped foam with the adhesive layer therebetween; e) curing the adhesive layer; and
f) removing the release paper.

12. The process according to claim 11, wherein steps a) to f) are performed in one operation.

13. The process according to claim 10, wherein the following steps are performed:
a) providing a release paper and applying a whipped foam having a density within a range of from 200 to 800 g/l, on the whole or part of the surface thereof;
b) curing the whipped foam layer applied by step a), at an elevated temperature in a range of from 70 to 170° C., to form the layer of whipped foam;
c) applying an adhesive layer based on an aqueous polyurethane dispersion, to said layer of whipped foam on the side opposite of the release paper and/or to a sheet of block flexible foam;
d) applying the block flexible foam to the whipped foam with the adhesive layer therebetween;
e) curing the adhesive layer; and
f) removing the release paper.

* * * * *